Figure 1:
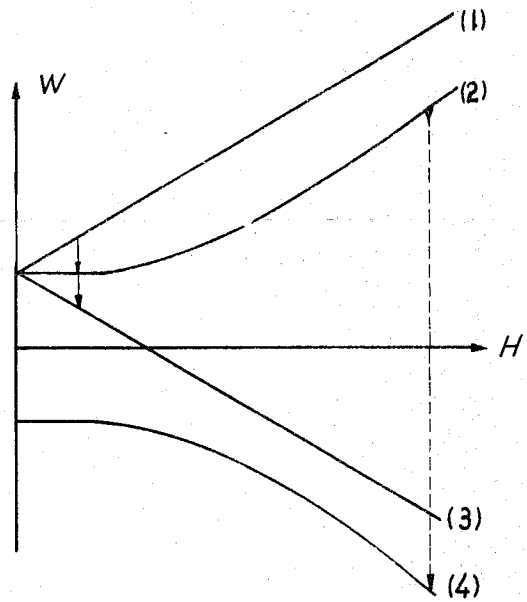

Nov. 15, 1966  A. ABRAGAM ETAL  3,286,162
METHOD OF POLARIZING IONS, AND SOURCES OF POLARIZED
IONS, NOTABLY PROTONS AND DEUTERONS, OBTAINED
THEREFROM

Filed July 23, 1963  2 Sheets-Sheet 1

INVENTORS
ANATOLE ABRAGAM
RENÉ BEURTEY
ANDRÉ PAPINEAU
JACQUES THIRION
BY  JACQUES MICHEL WINTER

Bacon & Thomas ATTORNEYS

Nov. 15, 1966　　　　A. ABRAGAM ETAL　　　3,286,162
METHOD OF POLARIZING IONS, AND SOURCES OF POLARIZED
　　IONS, NOTABLY PROTONS AND DEUTERONS, OBTAINED
　　　　　　　　　　THEREFROM
Filed July 23, 1963　　　　　　　　　　2 Sheets-Sheet 2

INVENTORS
ANATOLE ABRAGAM
RENÉ BEURTEY
ANDRÉ PAPINEAU
JACQUES THIRION
BY JACQUES MICHEL WINTER
*Bacon & Thomas*
ATTORNEYS United States Patent Office 3,286,162
Patented Nov. 15, 1966

3,286,162
METHOD OF POLARIZING IONS, AND SOURCES OF POLARIZED IONS, NOTABLY PROTONS AND DEUTERONS, OBTAINED THEREFROM
Anatole Abragam, Paris, René Beurtey, Marly-le-Roi, André Papineau, Gif-sur-Yvette, Jacques Thirion, Vaucresson, and Jacques Michel Winter, Versailles, France, assignors to Commissariat à l'Energie Atomique, Paris, France
Filed July 23, 1963, Ser. No. 296,993
Claims priority, application France, July 28, 1962, 905,423
18 Claims. (Cl. 324—.5)

This invention relates in particular to sources of polarized protons and deuterons, that is, particles having directed kinematic movements or spins.

Nuclear physics tests conducted with particle accelerators are inasmuch rich in useful information as the physical conditions of the interactions purposely produced are better determined. During the past few years scientists have been able to ascertain with precision the nature and energy quantum of the particles bombarding a target comprising also well-defined electrons and nuclei. However, a physical magnitude remained if not completely unknown at least completely subjected to the laws of chance: this physical magnitude is the so-called spin or kinetic moment, which may assume a certain number of discrete values. The particles distribute themselves as a rule into groups or populations numerically nearly equal in number which have these various values. Therefore, it was practically impossible to determine with precision the influence of spin in the interactions being studied. Partially polarized targets have firstly been obtained, notably through the "solid effect" method, according to an invention of M. Anatole Abragam.

Sources of polarized particles intended for subsequent acceleration processes have subsequently been developed, notably by the applicants (see in this respect the paper by R. Beurtey et al., 1961, N. 2 del Supplemento al vol. 19, serie X del Nuoyo Cimento, p. 207–220), this type of source utilizing an atomic jet like all sources of polarized nuclei. After this atomic jet has been produced the atoms (hydrogen or deuterium atoms in this case) flow firstly through a magnetic field characterized by very pronounced gradients (conventional device of the so-called Stern and Gerlach type). The consequence of these gradients is that they separate the atoms characterized in a strong field by very different magnetic moments, i.e. in practice the atoms of which the electron magnetic moments, which provide a prevalent percentage of the total magnetic moment, are opposed. Since the magnetic moments are closely related to the spins, the Stern and Gerlach device permits of isolating the atoms of which the electron spin has one of the two possible values.

The atomic jet is directed thereafter through an alternating electromagnetic field in which magnetic dipolar transitions are induced either according to the so-called "exact resonance" method, taught by Rabi, which is characterized by the presence of a constant and uniform magnetic field in the space in which said electromagnetic field is created, or according to the so-called "adiabatic passage" method taught by Bloch, which is characterized by a linear variation in the constant field. In the Bloch method this linear field is of the order of 800 to 1,000 oersteds, otherwise, as will be explained presently the desired effect cannot be obtained.

Each one of these two last-named methods permits of "rocking" the nuclear and electron spins simultaneously. This rocking effect affords a good nuclear polarization. Then it is only necessary to ionize these atoms within a ion source so designed that it will not destroy the nuclear polarization, for example a source of the magnetron type, and to introduce them into the accelerator device, for example of the cyclotron type, a suitable target being finally bombarded by these atoms at the output end of the cyclotron.

Unfortunately, each one of these two known methods have a serious drawback; thus the "exact resonance" method is subordinate to a very high degree of field-frequency stability; as to the adiabatic passage method in a strong constant field, it necessitates the use of an alternating field having a very high frequency of the order of 3,000 mHz. with an amplitude of a few oersteds. The oscillator (as a rule a magnetron) is therefore extremely costly.

It is the essential object of the present invention to provide a method of polarizing ions, which is applicable notably to sources of ions for accelerator devices, while avoiding the drawbacks set forth hereinabove.

This method comprising the steps of conveying these particles in the form of atomic jets, separating the atoms in said jet according to the value of their electron spin, and inducing magnetic dipolar transitions by means of a high-frequency electromagnetic field at the frequency of said transitions in the presence of a magnetic field unmodulated in time having a nearly linear gradient along the direction of propagation of the atoms, at right angles to this direction, according to the so-called adiabatic passage method. This method is characterized essentially in that the average value of the unmodulated field is low enough to cause the variation in the internal energy of the atom is a practically linear function of magnetic field from zero value to said average value, for all permissible quantum states for the electron and nuclear spins.

As will be made clear presently, adhering to this linearity requirement involves the equality in the frequencies of several among the magnetic dipolar transitions to which the atom may be subjected, and therefore the possibility, peculiar to this invention, of inducing several transitions of this character with the assistance of a high-frequency field. It is equivalent to the setting of an upper limit for said average value of the constant magnetic field, which limit is 25 oersteds in the case of the hydrogen atom and 15 oersteds in the case of the deuterium atom. However, this upper limit is not critical; in other words, it is not strictly impossible to carry out the method of the present invention by overstepping it. The only inconvenience is that the nearer one gets to this limit the less satisfactory are the results obtained with the method of his invention, all the more when this limit is overstepped. In any case, this limit is considerably lower than the field values utilized heretofore in the adiabatic passage method.

On the other hand it is not sufficient to have an average value of the constant field considerably lower than this limit: this invention is carried out preferably by making this average value definitely higher than two oersteds. This lower limit calls for the same remarks as the upper limit.

Figure 2:
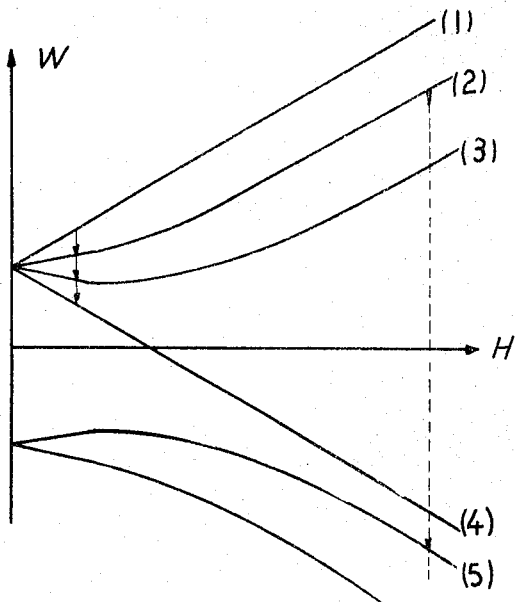

In order to afford a clearer understanding of the present invention, reference should be made to FIGS. 1 and 2 of the attached drawings. FIG. 1 illustrates in diagrammatic form the variation in the internal energy of a hydrogen atom as a function of the external magnetic field to which it is subjected. The field H is plotted in abscissa against the energy W in ordinate. The various curves differ by the values of the electron and nuclear spins. Thus, curves 1 and 2 correspond, in a strong field, to a $+\frac{1}{2}$ electron spin, and curves 3 and 4 represent an electron spin value of $-\frac{1}{2}$, curves 1 and 4 to a proton spin value of $+\frac{1}{2}$, and in the case of curves 2 and 3 this last named spin value is $-\frac{1}{2}$. FIG. 2 is similar to FIG. 1 and applies to the atom of deuterium or heavy hydrogen; in this case curves 1, 2 and 3 correspond to an electron spin of $+\frac{1}{2}$, and in the case of curves 4, 5 and 6 the electron spin value is $-\frac{1}{2}$, curves 1 and 6 to a deuteron spin value of $+1$, curves 2 and 5 to a zero deuteron spin, and curves 3 and 4 to a $-1$ deuteron spin.

The Stern and Gerlach device permits, as already set forth hereinabove, of eliminating atom populations or groups having an electron moment equal to $-\frac{1}{2}$ (curves 3 and 4 of FIG. 1, curves 4 and 5 and 6 of FIG. 2). The method of adiabatic passage in a strong field (but not in a very strong field for the useful transitions would be definitely precluded or "forbidden") corresponds in FIG. 1 to the transition represented by the dotted line arrow, of which the abscissa represents the mean value of the constant field and the length of the energy interval of this transition, i.e. its frequency. This enables the population to change from state 2 to state 4 and, since the total population was equally distributed beforehand among states 1 and 2, to obtain a positive protonic polarization approximating unity (the term "polarization" designates the average value obtained by balancing the various values which a value proportional to the spin may assume, and varying from plus to minus according to the population corresponding to these values. We have pointed out hereinabove the inconveniences involved in high field values and more particularly in high frequency values, in the application of this method.

It is scarcely possible to reduce strongly the average value of the constant field, that is, to shift the dotted arrow to the left (in FIG. 1), as this would reduce the frequency of the alternating field to be applied.

In fact, it will be seen that the slope of curves 2 and 4 decreases with the field. As a result, the transition in question, characterized by a zero variation in the total spin, cannot be created in a weak field, in the case of the adiabatic passage method for in a weak field the frequency would become independent of field strength. Now it is well known to those conversant with the art that this method is characterized by a variation in the constant field about the value of exact resonance, which variation is efficient only to the extent in which it leads to a condition wherein the value of the constant frequency seen by the atoms be definitely crossed by the variable value of their resonance frequency.

As to the transition from state 1 to state 3 which would likewise afford a good polarization, although these remarks are not applicable thereto, it is strictly "forbidden" in a strong field by the rules of quantum mechanics. Completely similar reasons would demonstrate that in the case of deuterium it is not possible either to reduce strongly the average value of the constant field in the case of the adiabatic passage method prior to this invention.

The method according to this invention consists on the contrary in determining transitions by adiabatic passage at the level of the thick line arrows of FIGS. 1 and 2. More particularly, in the case of hydrogen atoms, the atom population which was in state 1 is caused to change to state 3, and the atom population which was in state 2 remains in this state; in the case of deuterium atoms, the atom propulation which was in state 1 changes to state 4, and the atom population which was in state 3 changes to state 2, these passages or transitions being obtained by means of an alternating magnetic field of a frequency corresponding to the energy interval between two adjacent levels.

Under these conditions it will be seen that in the case of proton the polarization is still close to unity but negative, and that in the case of deuteron this polarization is equal to $-\frac{2}{3}$, at least when the field strength has resumed a high value, by using an alternating field of relatively low frequency, which is obviously easy to produce.

In addition to the discrepancy just set forth between the methods of adiabatic passage in a weak or strong field, respectively, that is to say the opposite sign of the resulting polarizations, stress may be laid on the fact that according as one or the other method is applied the variation in the projection of the total spin on the field differs, as well as the fact that in the first method the alternating field is perpendicular to the constant field, whilst it is parallel thereto in the second method, at least in the hitherto known application thereof in the case of hydrogen.

A number of precautions should be taken when carrying out the method of this invention:

(I) In order to obtain the integral exchange of the atomic populations designated hereinabove, the transitions must necessarily be carried out in the form of adiabatic passages. For a one-oersted value of the alternating field $H_1$ proper conditions consist in causing the constant magnetic field to vary between the two ends of the high-frequency field from $(H+2)$ oersteds to $(H-2)$ oersteds, the field H corresponding to the exact resonance.

(II) The supporting field H should be relatively low according to this invention so that the energetic separations between the states 1 and 2, 2 and 3 and finally, in the case of deuterium, between states 3 and 4 be relatively closely spaced, the typical test being that the relative difference between the extreme frequencies in relation to the average frequency be lower than the ratio $H_1/H$. Under these conditions it is clear that $H<15$ oersteds in the case of deuterons, and $H<25$ oersteds in the case of protons. It is obvious that necessarily $H<15$ oersteds in the case of deuterons and $H<25$ oersteds in the case of protons.

(III) The field H must be strong enough to avoid resonances of an upper order which might be produced during the adiabatic passage. It seems that a field H of more than two or three oersteds can be used.

Reference to the diagrammatic FIGS. 3, 4 and 5 of the attached drawings will now be made to describe two examples, given by way of illustration, of practical embodiments of the method of this invention for polarizing ions, notably proton and deuteron ions. The forms of embodiment described hereinafter in connection with these examples should be regarded as forming an integral part of the present invention, it being understood that any equivalent arrangements may be used without departing from the spirit and scope of the invention as set forth in the appended claims.

The figures illustrate only the component elements necessary for the proper understanding of this invention, the corresponding elements of these figures being designated by the same reference numerals.

Figure 3:
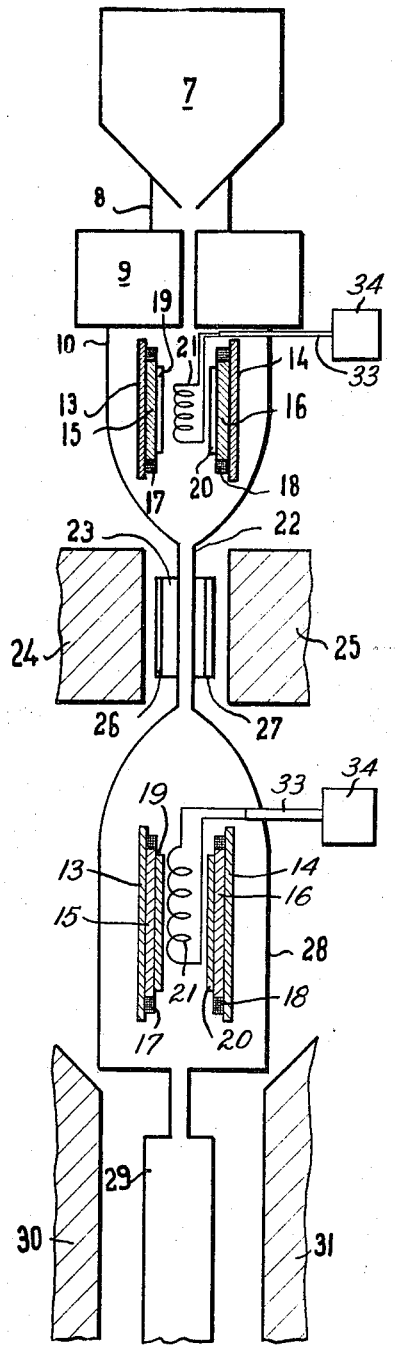

FIG. 3 shows the device 7 designed for delivering an atomic jet of hydrogen or deuterium, the connecting tube 8 for sealing the device against leakages, the six-pole electromagnet 9 creating strong gradients of magnetic field and constituting the Stern and Gerlach device mentioned hereinabove. (It is known that an atomic jet is an atom beam of small section and low density, travelling in a general direction, these atoms having negligible transverse speeds in relation to the general velocity and having no interaction.)

It may be noted that these elements may be similar to those described in the paper cited hereinabove which was published in the Italian review "Nuovo Cimento"; in the device 7 a high-frequency voltage (20 mHz.) is fed to two zones of V-shaped Pyrex glass tube filled with hydrogen and deuterium. The jet is issued from a nozzle disposed centrally of the tube. The molecular hydrogen penetrating into the tube is wetted by passing through a bottle filled with water. The water steam proportion is adjusted at about 10%. The optimum length of the tube arms is about 15 centimeters. A good condition of the inner surface of the tube walls, which is necessary to avoid the recombination of atoms on these walls, is obtained by cleaning these with hydrofluoric acid. With a 2-mm. Hg hydrogen pressure and a 10% steam content the dissociation is qualitatively complete. The high-frequency power is of the order of 1 kw.

The atom flow at the outlet end of the Pyrex tube takes place through the two-orifice succession according to the work of E. N. Becker and K. Bier, as reported in Z. Naturf., 1954, 9a:975 and the work of K. Clausnitzer, as reported in Z. Physik, 1959, 153:609. The first orifice consists of the already mentioned Pyrex nozzle having a diameter of 2 millimeters. The second orifice is a tantalum "peeling-knife" of very sharp conical configuration, disposed about 5 mm. from the nozzle end. This cone is 3 mm. long, the inner and outer aperture angles are respectively 50° and 70°; the 1 mm. central hole acts as an objective for the six-pole lens constituting the Stern and Gerlach magnet. The intermediate space is vacuumized by means of a gear pump. The pressure in this space is of the order of $10^{-2}$ mm. Hg under operative conditions. The assembly gives a jet concentration and a velocity spectrum theoretically narrower and also an axial intensity greater than in the case of a simple cylindrical hole. However, these advantages are reduced by the fact that the average speed is increased, thus making it more difficult to operate the Stern and Gerlach separating magnet. The solid input angle within the magnet is then defined by a high-vacuum compartment having a negative pressure of $10^{-4}$ mm. Hg during operation, with a length of 25 mm., this compartment terminatitng with a diaphragm. This compartment is pumped by means of a 2,000-liter Leybold pump. The number of atoms in a solid angle of $1/1000$ of a steradian is $3.10^{16}$ per second.

As to the six-pole electro-magnet 9, its yoke is cylindrical and the inside of this yoke (having a 500-mm. diameter) is completely in a vacuum; the coils embedded in araldite comprise 20 convolutions and consist of a square-sectioned tube cooled internally with water. The saturation commences at about 80 amperes.

Since the magnetic field is high, two kinds of atomic paths can be distinguished as a first approximation: those wherein the spin of the atom electron is parallel and those wherein the spin is nonparallel in relation to the magnetic field. The first paths are those of atoms subjected to a force directed toward the axis (focusing force); the other paths are those of atoms subjected to a force diverging gradually from the axis. The atomic populations corresponding to curves 3 and 4 of FIGS. 1, 4, 5 and 6 of FIG. 2 are thus eliminated.

After having passed through the electromagnet 9 the atoms flow through the chamber 10 in which they are treated with the weak-field adiabatic passage method of this invention.

Figure 4:
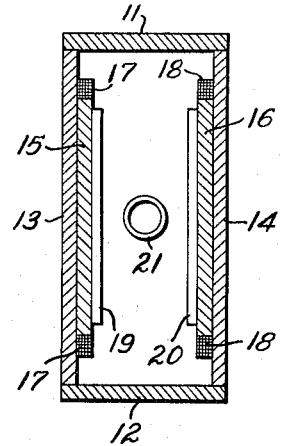
Figure 5:
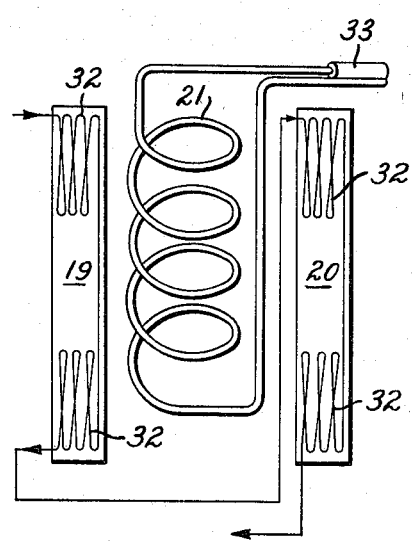

The means suitable for this purpose as illustrated in FIGS. 3, 4 and 5 are as follows:

A parallelipipedic frame forming a magnetic circuit made from a material having a high magnetic permeability without any remanence, such as the Armco alloy. Its thickness is 10 mm., its length is 100 mm., its width 50 mm., and its height 80 mm. It comprises two vertical plates 11, 12, two horizontal plates 13, 14, and pole pieces 15, 16.

The function of this frame is not only to constitute a magnetic circuit but also to provide a magnetic shield necessary to avoid disturbances due to the vincinity of an accelerator such as a cyclotron.

The constant magnetic field directed by this circuit is created, for its uniform component, by the coils 17 and 18 surrounding the pole pieces 15, 16 and comprising each ten turns of wire in series in the same direction, and for its non-uniform component, by plates 19, 20 lining the inner face of pole pieces 15 and 16 and containing each two coils 32 of ten turns of wire each, the currents having opposite directions in a same plate and the same directions in the pairs of coils registering with each other from one plate to another.

These plates are in the form of a square having 80 mm. sides and a 5 mm. thickness. The four coils 32 are connected electrically in series; the registering pair of coils which create a field having the same direction as the uniform field occupies for instance the first third, in the direction of the atom movement, of plates 19 and 20, whilst the pair of registering coils creating a field of opposite direction occupies the last third.

As to the high-frequency field, it is created by the coil 21 disposed coaxially to the atom jet.

This coil consists of a three-mm. long and two-mm. wide coil, having a diameter of two-mm. It is connected through suitable wiring cable 33 to an oscillator 34 tuned on the frequency of the transitions desired for a magnetic field value equal to that of the uniform component of the constant field created by the device just described. In the example selected for the case of hydrogen the uniform component of the field is six oersteds, its other component varying from $+2$ to $-2$ oersteds. As to the oscillator frequency it is 8 mHz. and its power 50 w., whereby an alternating field of a few oersteds can be obtained. Therefore, this alternating field can be obtained without difficulty.

When the atoms have passed through the chamber 10 the population corresponding to curve 1 of FIG. 1 has changed to the state corresponding to curve 3. In other words, the proton polarization is $$\tfrac{1}{2}.(-1)+\tfrac{1}{2}.(-1)=-1$$

In the case of deuterium, the population of the state corresponding to curve 1 of FIG. 2 changed to the state corresponding to curve 4; the population in the state corresponding to curve 2 changed to the state corresponding to curve 3, finally the population in the state corresponding to the state of curve 3 changed to the state corresponding to curve 2. In other words, all these populations being practically equal, a deuteron polarization in a strong field which is equal to $\tfrac{1}{3}.0+\tfrac{1}{3}(-1)+\tfrac{1}{3}.(-1)=-\tfrac{2}{3}$ is obtained.

These results correspond perfectly to the objects contemplated by the applicants, and it is perfectly possible to consider the delivery of the atomic jet issuing from chamber 10 directly to the ion source of the accelerator device. However, in most cases it is interesting to give up the advantages of simplification and economy afforded by this invention for increasing those resulting from the strong polarization values obtained therewith.

To this end, the atoms are subsequently fed through the quartz tube 22 having a diameter of ten mm., which extends through the resonant rectangular cavity 23 tuned in the case of hydrogen on a 2,900 mHz. frequency (in this example) and fed from a magnetron (not shown) delivering thereto a power of less than 100 w. (in all the cases contemplated in the present description).

The alternating magnetic field thus created is vertical in the case of hydrogen atoms and parallel to the jet in the case of deuterium. This cavity 23 is disposed between the pole pieces 24, 25 of an electromagnet (not shown) adapted to create a uniform constant field of about 900 oersteds (still in the case of hydrogen). Finally, two plates 26, 27 having a composition completely similar to that of plates 19, 20 create a constant field variation of about $\pm 11$ oersteds about this average value.

This application of the method of adiabatic passage in a strong field will be readily seen in this device.

The atoms subsequently flow into a chamber 28 similar to chamber 10 and containing the same component elements, thus permitting a new adiabatic passage in a weak field. They are finally directed into the vacuum chamber 29 of a cyclotron of which only the pole pieces 30 and 31 are visible in the figure. They are ionized in the center of this cyclotron by an ion source, for example of the magnetron type, whereby the nuclear polarization can be preserved. As is well known, the preservation of nuclear polarization presents no difficulty if ionization takes place in a magnetic field.

Finally, electronic means (not shown) are provided for rapidly (in about one microsecond) discontinuing the high-frequency supply of any one or a plurality of the three members producing the transitions, that is, coil 21 in chamber 10, cavity 23 or the coil 21 which is located within the chamber 28.

This assembly is operated as follows:

In the case of hydrogen atoms now only chamber 10, now only cavity 23 is fed with high frequency.

In the first case, as already explained hereinabove there is obtained a nuclear polarization equal to −1; in the second case a nuclear polarization equal to +1 is obtained (transition illustrated by the dotted arrow of FIG. 1).

In the case of deuterium atoms the simple application of the adiabatic passage in a weak field leads, as already explained, to a nuclear polarization equal to −⅔ for, after passing through the device 9 the atom population was also divided among the states 1, 2 and 3 after passing through the chamber 10, the population which was in state 1 being transferred to state 4, the atomic population is thus finally equally distributed among states 2, 3 and 4.

Then if, by resorting to an adiabatic passage in a strong field (or more exactly a mean field) within the cavity 23 with the average value of the constant field being 1,030 oersteds a transition is induced to change the atom population from state 2 to state 5 (dotted arrow), which leads to an equal distribution of the atoms among the states 3, 4 and 5, if a new adiabatic passage in a weak field within chamber 28 is subsequently effected, whereby the population previously in state 5 will be changed to state 5 while those previously in state 3 and 4 are changed to states 2 and 1 respectively, whereby a nuclear polarization equal to ⅓.(+1)+⅓.(0)+⅓.(+1)=⅔ is obtained.

It will be noted that the deuteron polarizations of +⅔ or −⅔ thus obtained correspond to a pure vectorial polarization, i.e. this polarization may be represented completely by a three-component vector according to the three dimensions of space.

It would also be possible, from a population of deuterium atoms equally distributed among states 1, 2 and 3 at the outlet of device 9, to effect within the chamber 23 with the average value of the constant field being 950 oersteds the transfer of the population which was in state 1 to state 6. A total population equally distributed among states 2, 3 and 6 is obtained, and under these conditions it is possible to produce an adiabatic passage in a weak field, which would be the first in this case, within the chamber 28, which passage would exchange the populations of states 2 and 3 and cause those of the atoms previously in state 6 to change to state 5; thus, a population distributed among states 2, 3 and 5 is obtained. If in lieu of the transition between states 1 and 6 in cavity 23 the transition between states 3 and 4 is effected with the average value of the constant field being 1,100 oersteds, whereby the atoms are equally distributed among the states 1, 2 and 4, and if an adiabatic passage is further effected in chamber 28, thus exchanging the populations of states 2 and 3, a population equally distributed among states 1, 3 and 4 is obtained.

These two distributions between states 2, 3 and 5 and between states 1, 3 and 4 correspond to a same vectorial polarization equal to −⅓ but at equal tensor polarizations having opposite signs.

All the various adiabatic passages in weak field thus utilized for deuterium atoms correspond to the same field and frequency conditions. On the other hand, in the case of transitions carried out within cavity 23 the following values may be considered as suitable:

For transitions from state 2 to state 5 the average value of the constant field is 1,030 oersteds, from state 1 to state 6, 950 oersteds, and from state 3 to state 4, 1,110 oersteds, the frequency of the alternating field being 2,900 mHz. in the three cases.

The advantages resulting from the arrangement described hereinabove over those utilized heretofore may be summarized as follows:

(I) The transition efficiencies approximate 100%. Notably, when they are carried out in cavity 23, the transitions causing the atom populations to change from state 1 to state 6, from state 2 to state 5 and from state 3 to state 4 are easier than those causing said atom population to change from state 2 to state 6 in previously known devices. Therefore, cavity 23 may be fed from a magnetron of only moderate power, less than 100 w., thus reducing cost considerably.

(II) The device housed within chamber 10 or 28 is very economical, as already pointed out, for the continuous field is relatively low (3 to 15 oersteds), as well as the frequency to be applied to coil 21.

Of course, this advantage is effective only if a vectorial polarization of only −⅔ for the deuterons and −1 for the protons is deemed sufficient.

(III) The experimental possibilities afforded by this method are as wide as desirable. Thus, with hydrogen atoms it is possible to bombard a target with protons having a +1 polarization and immediately thereafter (the time interval being of the order of a microsecond) with protons having a −1 polarization, whereby any geometrical effects can be eliminated in the symmetry measurements (the polarization passing from +1 to −1, all other elements being equal on the other hand, the variation in the observed effects being only ascribable thereto).

In the case of deuterium, a similar advantage is obtained, the vectorial polarization being adapted to pass from +⅔ to −⅔. As to polarizations having a tensor component, it is also possible to isolate the effects of this component in a similar manner by virtue of the two above-mentioned equal distributions which corerspond to vectorial polarizations of −⅓ but of opposite tensor polarizations.

Of course, the present invention should not be construed as being limited to the forms of embodiment shown, described or suggested herein; as a matter of fact, it is possible, without departing from the spirit and scope of the invention, to associate in many ways the separation members by gradient of magnetic field, with the members of adiabatic passage in a weak field, of adiabatic passage in a strong field, even of induction of transitions by exact resonance or saturation.

We claim:

1. In an apparatus for producing ions, a chamber for inducing dipolar magnetic transitions by adiabatic passage in a weak field including means for creating an electromagnetic field of high frequency in the presence of a constant magnetic field undergoing approximately linear variation along the length of the chamber comprising a high frequency coil, two polar plate pieces disposed parallel to the windings of said high frequency coil, each polar plate being surrounded by coils carrying the same number of spirals in series in the same direction and the inner face of each polar plate being lined with a plate which contains two coils of the same number of turns, said last four coils being connected in series so that the currents in each pair of coils on a plate have opposite directions in that plate, but the same direction with the registering pair of coils in the opposite plate.

2. Apparatus for producing polarized ions comprising in combination means for forming an atomic jet, means for separating this atomic jet into two portions according to electron spin, a first means for inducing dipolar transitions by adiabatic passage in a weak field by means of an electromagnetic field of high frequency in the presence of a constant magnetic field undergoing a substantially linear variation in the direction of propagation of the atomic jet, a second means for inducing dipolar transitions by adiabatic passage in a strong field, a third means for inducing magnetic dipolar transitions by adiabatic passage in a weak field and then means for ionizing the polarized particles.

3. Apparatus according to claim 2 including an electric generator of high frequency for producing said high frequency magnetic field in each of said three means for inducing transitions and means for electronically intermittently discontinuing the generation of said high frequency magnetic field in each of said three means whereby magnetic dipolar transitions are only induced when a high frequency magnetic field is produced in each of said three means.

4. Apparatus according to claim 2 including means for successively operating said first means for inducing magnetic dipolar transitions and then said second means.

5. Apparatus according to claim 2 including means for alternatively operating only said first means and then all of said three means for inducing magnetic dipolar transitions.

6. A method of polarizing the atoms in an atomic jet of hydrogen or deuterium comprising the steps of separating this jet into two streams according to the value of their electron spin; inducing magnetic dipolar transitions in the atoms of one of said spin separated streams, the said transitions being obtained by adiabatic passage in a weak field by passing one of said streams through a high frequency magnetic field substantially at the frequency of said transitions in the presence of a second magnetic field unmodulated in time, the magnitude of said second field having a constant gradient in the direction of propagation of said atomic jet and the average value of said second field being sufficiently low in order that the variation in the internal energy of the atom be a substantial linear function of mangetic field from zero to said average value for all permissible quantum states of the electron and nuclear spins.

7. A method of providing a source of polarized ions comprising the steps of forming an atomic jet of hydrogen or deuterium, separating this jet into two streams according to the value of their electron spin, inducing magnetic dipolar transitions in the atoms of one of said spin separated streams, the said transitions being obtained by adiabatic passage in a weak field by means of a high-frequency electromagnetic field at the frequency of said transitions in the presence of a second magnetic field unmodulated in time, the magnitude of said second magnetic field having a substantially constant gradient in the direction of propagation of said atomic jet, the average value of said second field being sufficiently low in order that the variation in the internal energy of the atom be a substantially linear function of magnetic field from zero to said average value for all permissible quantum states for the electron and nuclear spins, and ionizing said polarized atomic jet.

8. A method according to claim 7 comprising inducing magnetic dipolar transitions in a jet of atomic hydrogen by means of an adiabatic passage wherein the magnitude of the second magnetic field is between about 2 and 25 oersteds.

9. A method according to claim 7 comprising inducing magnetic dipolar transitions in a jet of atomic deuterium wherein the magnitude of the second magnetic field is between about 2 and 15 oersteds.

10. A method according to claim 7 comprising along the propagation of said atomic jet, subjecting the atoms to a plurality of dipolar magnetic transitions, at least one of said transitions being induced by adiabatic passage in a weak field.

11. A method according to claim 14 comprising inducing magnetic dipolar transitions by adiabatic passage in a weak field and then by adiabatic passage in a strong field.

12. A method according to claim 10 comprising electronically controlling the production of said transitions by discontinuing the production of said high frequency magnetic field.

13. A method according to claim 12 comprising discontinuing the production of said high frequency magnetic field for intervals of the order of a microsecond.

14. A method according to claim 7 comprising passing said spin separated streams of the atomic jet successively through zones where magnetic dipolar transitions are induced by a first zone for adiabatic passage in a weak field, a second zone for adiabatic passage in a strong field and then a third zone for adiabatic passage in a weak field.

15. A method according to claim 14 comprising electronically intermittently discontinuing the inducing of magnetic dipolar transitions in at least one of said zones during the same time interval.

16. A method according to claim 15 comprising inducing magnetic dipolar transitions by adiabatic passage in a weak field solely and then inducing transitions simultaneously in all of three zones and the frequency of the alternating field in said second zone being 2900 mHz. and the average value of the constant field being 1030 oersteds.

17. A method according to claim 15 comprising inducing magnetic dipolar transitions in the spin separated jet of deuterium by successively passing said jet through a zone of adiabatic passage in a strong field and then a zone of adiabatic passage in a weak field where the frequency of the electromagnetic field in said strong zone being 2900 mHz. and cycling the average value of the constant field between 950 oersteds and 1100 oersteds in said strong zone.

18. In an apparatus for producing polarized atoms, a chamber for inducing dipolar magnetic transitions by adiabatic passage in a weak field comprising a high frequency coil for generating a frequency of said transitions and for creating an electromagnetic field in said chamber and coils and associated pole plates for producing a magnetic field constant in time and having approixmately constant gradient along the length of said chamber.

References Cited by the Examiner
UNITED STATES PATENTS

| | | | |
|---|---|---|---|
| 2,948,861 | 8/1960 | Babb | 331—3 |
| 2,994,836 | 8/1961 | Holloway | 331—3 |
| 3,021,448 | 2/1962 | Daly | 315—5.35 |

OTHER REFERENCES

Beurtey et al.: Del Nuovo Cimento Supplement to vol. 99, Series 10, No. 2, 1961 (1 Trimestre) pp. 207–220 inclusive.

Goldenberg et al.: Physical Review Letters, vol. 5, No. 8, Oct. 15, 1960, pp. 361 and 362.

Kleppner et al.: Physical Review, vol. 126, No. 2, April 15, 1962, pp. 603–615 inclusive.

Vessot et al.: IRE Transactions on Instrumentation, vol. I–11, Nos. 3–4, Dec. 1962, pp. 183–187 inclusive.

RUDOLPH V. ROLINEC, *Primary Examiner.*

MAYNARD R. WILBUR, CHESTER L. JUSTUS,
*Examiners.*

A. E. RICHMOND, *Assistant Examiner.*